United States Patent
Zhang et al.

(10) Patent No.: US 9,160,650 B2
(45) Date of Patent: Oct. 13, 2015

(54) ENHANCED FLOW ENTRY TABLE CACHE REPLACEMENT IN A SOFTWARE-DEFINED NETWORKING SWITCH

(71) Applicant: Futurewei Technologies, Inc., Plano, TX (US)

(72) Inventors: Hong Zhang, Palo Alto, CA (US); Kalyan Das, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 141 days.

(21) Appl. No.: 13/919,793

(22) Filed: Jun. 17, 2013

(65) Prior Publication Data

US 2014/0369348 A1 Dec. 18, 2014

(51) Int. Cl.
*H04L 12/727* (2013.01)
*H04L 12/757* (2013.01)
*H04L 12/771* (2013.01)
*H04L 12/753* (2013.01)

(52) U.S. Cl.
CPC ............ *H04L 45/121* (2013.01); *H04L 45/023* (2013.01); *H04L 45/48* (2013.01); *H04L 45/563* (2013.01)

(58) Field of Classification Search
CPC ....... G06F 8/41; G06F 8/447; G06F 9/45516; H04L 45/121; H04L 45/023; H04L 45/563; H04L 45/58
See application file for complete search history.

(56) References Cited

U.S. PATENT DOCUMENTS

| | | | | |
|---|---|---|---|---|
| 6,636,944 | B1* | 10/2003 | Gilbert et al. | 711/133 |
| 6,996,678 | B1* | 2/2006 | Sharma | 711/133 |
| 2002/0021675 | A1* | 2/2002 | Feldmann | 370/254 |
| 2004/0264384 | A1* | 12/2004 | Deval et al. | 370/252 |
| 2006/0155934 | A1* | 7/2006 | Rajamony et al. | 711/134 |
| 2007/0156964 | A1* | 7/2007 | Sistla | 711/133 |
| 2008/0177951 | A1 | 7/2008 | Bartley et al. | |
| 2010/0325365 | A1* | 12/2010 | Colglazier | 711/136 |
| 2011/0153949 | A1* | 6/2011 | Olszewski et al. | 711/133 |
| 2012/0124295 | A1* | 5/2012 | Humlicek et al. | 711/136 |
| 2012/0151149 | A1* | 6/2012 | Dubrovin et al. | 711/133 |
| 2012/0233349 | A1* | 9/2012 | Aybay | 709/234 |
| 2013/0089094 | A1* | 4/2013 | Csaszar et al. | 370/390 |
| 2013/0114606 | A1* | 5/2013 | Schrum et al. | 370/395.53 |
| 2013/0254491 | A1* | 9/2013 | Coleman et al. | 711/133 |
| 2014/0098669 | A1* | 4/2014 | Garg et al. | 370/235 |

(Continued)

OTHER PUBLICATIONS

Xiaocui Sun, An effective Caching on Forwarding Table Scheme for Metro Ethernet, 2010, pp. 1-6.*

(Continued)

*Primary Examiner* — Thuy Dao
*Assistant Examiner* — Mongbao Nguyen
(74) *Attorney, Agent, or Firm* — Conley Rose P.C.; Grant Rodolph; Brandt D. Howell

(57) ABSTRACT

In a network switch of a software-defined network (SDN) architecture, a method for improving cache replacement (CR) efficiency implemented therein, the method comprising maintaining a flow table comprising a plurality of flow entries, computing a replacement index (RI) value for each of the plurality of flow entries resulting in a plurality of RI values, wherein computing an RI value for a flow entry is at least partially based on latency sensitivity of a forwarding path specified by the flow entry, and generating, based on at least some of the computed RI values, an eviction list comprising a number of list entries, wherein each of the list entries points to one of at least a fraction of the flow entries.

11 Claims, 5 Drawing Sheets

(56) References Cited

U.S. PATENT DOCUMENTS

2014/0115260 A1* 4/2014 Maybee et al. ............ 711/136
2014/0115261 A1* 4/2014 Maybee et al. ............ 711/136
2014/0122634 A1* 5/2014 Conner et al. ............ 709/212
2014/0149651 A1* 5/2014 Forsyth et al. ............ 711/105

OTHER PUBLICATIONS

Paul Congdon, Packet Prediction for Speculative Cut-Through Switching, 2008, pp. 1-7.*

Aaron Rosen, Network service delivery and throughput optimization via software defined networking, 2012, pp. 4-9 and 31-46.*

* cited by examiner

ENHANCED FLOW ENTRY TABLE CACHE REPLACEMENT IN A SOFTWARE-DEFINED NETWORKING SWITCH

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication networks comprise network nodes, such as routers, switches, bridges, and other devices, that transport data through the networks. Over the years, the networks have become increasingly complex, leading to inter-woven webs of network nodes. As a result, node vendors have struggled to customize, optimize, and improve the performance of the nodes. Software-defined networking (SDN) is an emerging network technology that may improve customization, optimization, and improvement of networks. SDN may simplify networks by decoupling data-forwarding functionality (sometimes referred as a data plane) from a routing, resource, and other management functionality (sometimes referred as a control plane). As a result, while traditional network nodes may provide both the data plane functionality and the control plane functionality, an SDN node (e.g., a switch) may provide the data plane functionality and a centralized SDN controller may provide the control plane functionality.

In an SDN architecture, the control plane functionality may be extracted from each individual switch to a centralized SDN controller, which may be remotely coupled to a plurality of switches in the SDN. On one hand, the SDN controller may build a flow table (sometimes referred to interchangeably as a flow entry table or flow forwarding table), which comprises a plurality of flow entries. Each flow entry comprises matching fields that classify a traffic flow and an action that should be executed on the traffic flow. On the other hand, each switch may keep a cached copy of some or all flow entries of the flow table. A switch may forward incoming packets based on the flow entries in its cache.

Sometimes, no flow entry can be found in a cache of a switch, which may be called a table-miss or cache-miss. In this case, the switch may either drop the packet or send the packet to the SDN controller for a forwarding decision. Since in SDN architecture, the control plane and the data plane are put into different devices and they communicate via a network, potential delay may be introduced into routing a packet, e.g., in case an entry-miss is not as trivial as that in a non-SDN model. Packet delay may be a problem for certain application packets (e.g., voice packets) that are latency sensitive. Therefore, it is desirable to improve packet switching to minimize or reduce packet delay.

SUMMARY

In one example embodiment, a flow table is maintained in a software-defined networking (SDN) switch and comprises one or more flow entries. Further, a replacement index (RI) value is computed for each of the one or more flow entries, thereby resulting in one or more RI values. In this example embodiment, computing an RI value for a flow entry is at least partially based on latency sensitivity of a forwarding path specified by the flow entry. Since different forwarding paths may carry different latency sensitivities, subsequent replacement of the one or more flow entries in the SDN switch may be performed more efficiently.

In another example embodiment, an SDN switch is configured to store a cached flow table comprising a plurality of flow entries, and compute an RI value for each of the plurality of flow entries resulting in a plurality of RI values, wherein computing an RI value for a flow entry is at least partially based on usage recency of the flow entry and usage frequency of the flow entry, and wherein a value of the usage frequency is updatable with reuses of the flow entry. Since the updatable usage frequency takes into account the variable nature of this parameter, subsequent replacement of the one or more flow entries in the SDN switch may be performed more efficiently.

In yet another example embodiment, an SDN controller is configured to receive a packet from a SDN switch, wherein the packet comprises a connection between a source and a destination. The SDN controller determines a forwarding path for the packet, and transmits data comprising the forwarding path to the SDN switch, wherein the data comprises latency sensitivity of the packet. Due to the latency sensitivity sent to the SDN switch, the performance of cache replacement in the SDN switch can be improved.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
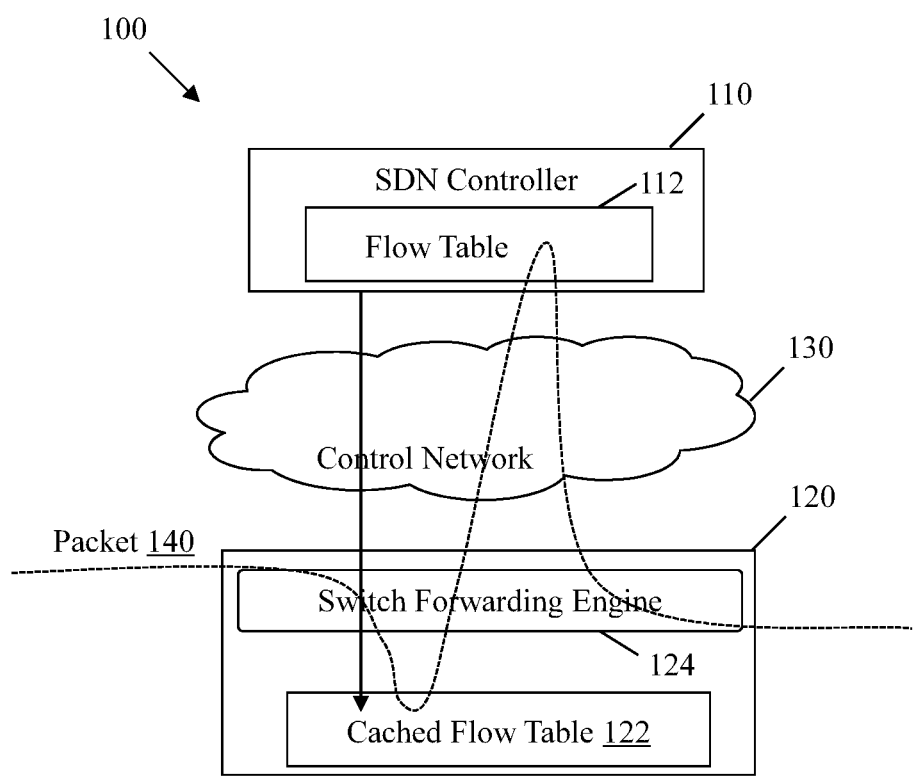
FIG. 1 illustrates an example embodiment of a software-defined network (SDN).

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The cache memory in a switch is limited in storage capacity, thus at some point, a cached flow table in the cache memory will be fully filled. Consequently, existing flow entries need to be replaced by new flow entries, e.g., through eviction of the existing flow entry, and filling-in of the new entry. Various cache replacement (CR) strategies or policies have been used in existing CR strategies. In a first example, a recency-based CR strategy may implement a least recently used (LRU) queue, and may replace one or more LRU entries in the queue. In a second example, a frequency-based CR strategy may implement a least frequently used (LFU) queue, and may replace one or more LFU entries in the queue. In a third example, a strategy (e.g., adaptive replacement cache mechanism) may be based on both recency and frequency. This type of strategy may either implement a least recently and frequently used (LRFU) queue or two separate queues (LRU and LFU) with ghost extensions. In a fourth example, randomized strategies may be used, e.g., as an attempt to use the variable nature of usage frequencies. When both recency and frequency factors are incorporated in a CR strategy, existing algorithms may assign a fixed weight or a qualitative weight (e.g., high or low but no counting) to the frequency factor irrespective of the actual number of times an entry is reused. Consequently, inappropriate weights or credits may be given to cache entries that are more frequently used, vis-à-vis cache entries that are less frequently used.

Disclosed herein are example embodiments that may improve the efficiency of CR while avoiding significant resource overhead. According to an example embodiment, in a software-defined network (SDN)-enabled switch, replacement of a flow entry may consider the latency sensitivity of a flow, the usage recency of the flow entry, and/or the usage frequency of the flow entry. By taking a new parameter—latency sensitivity—into consideration, certain latency sensitive applications or traffic flows may be given a higher chance of getting a cache hit in a cached flow table, thereby reducing their latency. Also, the usage frequency may be assigned a variable or countable weight, which may be updated periodically. To use this strategy, replacement index (RI) value may be calculated for some or all flow entries of a cached flow table. A fraction of the flow entries may be referenced by a newly established eviction list, which corresponds to flow entries with the lowest RI values.

In an embodiment of a CR operation, an entry of the eviction list having the lowest RI value may be removed from the eviction list, and a cached flow entry referenced by this entry of the eviction list may be filled with a new flow entry. The eviction list may be re-created after being fully emptied, or may be continuously replenished by a background process running in a network switch.

FIG. 1 illustrates an example embodiment of a software-defined network (SDN) 100, in which disclosed example embodiments may operate. For illustrative purposes, the network 100 comprises an SDN controller 110 and a switch 120, although it should be understood that the network 100 may comprise any suitable number of SDN controllers and/or switches. The switch 120 may be coupled to the SDN controller 110 via a control network 130, which may be implemented as any type of network, such as the Internet.

The SDN controller 110 may be located in a centralized location of the network 100 and coupled to multiple switches including the switch 120. A flow table 112 may be stored in a memory inside the SDN controller 110 and may comprise a plurality of flow entries. At least a portion of the flow entries in the flow table 112 may be copied by the switch 120 and stored in a cached flow table 122, which may reside in a memory inside the switch 120. The switch 120 may be implemented as any suitable type of switching device, such as a physical or a virtual switch, configured to route or forward a packet from an ingress port to an egress port. The cached flow table 122, sometimes referred to as a flow table cache, may be implemented using any suitable data structure.

In use, the switch 120 may receive incoming packets and determine their forwarding path based on the flow entries in the cached flow table 122. As shown in FIG. 1, a switch forwarding engine 124 implemented within the switch 120 may receive a packet 140 from an ingress port of the switch 120. The packet 140 may be a formatted unit of data used in network communications and may comprise any data. The switch forwarding engine 124 may interpret or read the packet 140 to obtain information regarding a source of the packet 140 and a destination of the packet 140. In some example embodiments, the source may determine an ingress port of a switch, and the destination may determine an egress port of the switch.

Then, the switch forwarding engine 124 may read the cached flow table 122 to determine whether any of its cached flow entries comprises a switching or forwarding path (e.g., an egress port or a next table to forward the packet) of the packet 140. If the forwarding path is found in the cached flow table 122, it is a cache hit and the switch forwarding engine 124 may then forward the packet 140 to an egress port based on the forwarding path. Otherwise, if the forwarding path is not found in the cached flow table 122, which is a case of cache miss illustrated in FIG. 1 (dashed line shows a path of information flow), the switch forwarding engine 124 may forward the packet 140 to the SDN controller 110 through the control network 130.

Upon reception of the packet 140 from the switch 120, the SDN controller 110 may also read the header of the packet 140, which may comprise its source and destination. In an example embodiment, a traffic flow comprising the packet 140 may be defined by Layer 2 (L2) to L7 headers of the packet 140, wherein source and destination information may be part of the L2-L7 headers. Then, the SDN controller 110 may find in the flow table 112 a flow entry that comprises a forwarding path for this packet flow. Note that if this entry is not present in the flow table 112, e.g., if a new connection is added to the SDN, the SDN controller 110 may resolve the forwarding path based on its internal control logic, policy from its control applications, and/or instructions from an administrator of the SDN controller 110. Further, the flow entry may comprise information of the levels of latency sensitivity. The SDN controller 110 may obtain information of a flow entry's latency sensitivity from, for example, an upper flow service manager.

The SDN controller 110 may send the corresponding forwarding path along with corresponding latency sensitivity information to the switch 120, which may then accordingly forward the packet 140. Further, the switch 120 may store this forwarding path into an entry of the cached flow table 122, such that if a second packet belonging to the same flow arrives at a later time, the switch 120 may directly forward the second packet without going through the SDN controller 110. In the event of a cache miss, the switch 120 may not be able to properly forward a packet until receiving a forwarding path from the SDN controller 110. Consequently, delivery of the packet may be delayed, which is undesirable especially for latency sensitive applications, such as voice over Internet Protocol (VoIP) communication or certain financial transactions.

Example embodiments of the present disclosure provide the ability to maximize a cache hit rate and/or minimize a cache miss rate. More specifically, in order to improve the efficiency of cache replacement while avoiding significant resource overhead, example embodiments incorporate a new parameter—latency sensitivity—into the CR strategy. In an example embodiment, in an SDN-enabled switch (e.g., the switch 120), replacement of a flow entry may consider the latency sensitivity of a flow, the usage recency of the flow entry, and/or the usage frequency of the flow entry. In order to use this strategy, an RI value may be calculated for some or all of the flow entries of a cached flow table (e.g., the cached flow table 122). If the cached flow table is full, an entry with the lowest RI may be evicted to make room for a new entry.

As used herein, the term "usage recency" (in short as "recency") is a term coined in conjunction with cache replacement algorithms. Recency may define how recently a cached entry was used or referred to by the switch. Recency can be represented by a time stamp of the most recent usage of the cached entry.

Similarly, usage frequency (in short as "frequency") may indicate the number of times a cache entry is referred while the entry is in the cache. When an entry is reused, the usage frequency may be incremented by one and recency may be reset to the current time.

On the other hand, latency sensitivity generally refers to a qualifier or parameter attached to a flow entry, usually when the flow entry is added to a cached flow table for the first time. When evaluating a proper path for an incoming flow, the value of latency sensitivity may be assigned by an SDN controller (e.g., the SDN controller 110) and then sent from the SDN controller to the SDN switch. The value of latency sensitivity typically will not change in the SDN switch, unless the SDN controller renews or updates it. It can be seen that by taking latency sensitivity into consideration, certain latency sensitive applications or traffic flows may be given a higher chance of getting a cache hit in a cached flow table, thereby reducing their latency.

When calculating a replacement index (RI) of a cached flow entry, a weight may be assigned to one or more of the three parameters, which are also referred to as replacement components. In an example embodiment, RI is computed using the following formula:

$$RI = recency * W_r + frequency * W_f + LS * W_l \quad (1)$$

where
recency=a normalized value indicating the usage recency of a cached flow entry,
frequency=a normalized value indicating the usage frequency of the flow entry,
LS=a normalized value indicating the latency sensitivity of a connection represented by the flow entry,
$W_r$=a weight assigned to the flow entry's recency and may have any value between 0 and 1, inclusive,
$W_f$=a weight assigned to the flow entry's frequency and may have any value between 0 and 1, and
$W_l$=a weight assigned to the flow entry's latency sensitivity and may have any value between 0 and 1.

The value range for each of these three components (recency, frequency, and LS) may be normalized or scaled to any suitable value range, e.g., as between 0 and 1, inclusive. For example, the oldest flow entry in a cached flow table has the lowest recency value, and this value may be mapped to 0, whereas the latest flow entry in the cached flow table has the highest recency value, and this value may be mapped to 1.

Specifically, for an i-th entry (i is an entry index) in a cached flow table that has recency=$T_i$, frequency=$F_i$, and latency sensitivity=$L_i$, its RI can be computed as:

$$RI_i = W_r * r_i + W_f * f_i + W_l * l_i \quad (2)$$

where $r_i$, $f_i$, and $l_i$ are normalized values (e.g., between 0 to 1) of recency, frequency, and latency sensitivity parameters, respectively.

In an example embodiment, the normalized values $r_i$, $f_i$, and $l_i$ can be computed using the following formulas:

$$r_i = (T_i - T_{oldest})/(T_{now} - T_{oldest}) \quad (3)$$

where $T_{oldest}$=a time reference for the oldest flow entry in the cached flow table, $T_{now}$=current time, and $T_{now} > T_{oldest}$ $$f_i = (F_i)/(F_{max}) \quad (4)$$

where $F_{max}$ is an integer, greater than one, indicating an upper limit on a reference counter (i.e., $F_i$ stops incrementing after reaching $F_{max}$);

$$l_i = (L_i/(L_{max})) \quad (5)$$

where $L_{max}$ is a positive integer indicating a highest latency sensitivity value.

Note that each of the weights $W_r$, $W_f$, and $W_l$ may have any suitable value. In an example embodiment, the three weights add up to one, as shown by equation (6). Although it should be understood that the weights may add up to any other value, e.g., as long as they maintain their relative values with respect to each other (e.g., all values may scale up by a factor of 5).

$$W_r + W_f + W_l = 100\% \quad (6)$$

For example, the weights may be configured as:

$$W_r = W_f = W_l = \frac{1}{3} \quad (7)$$

It can be seen that by combining some of the above formulas, such as formulas (2)-(5) and (7), the RI value can be computed for the i-th entry. Further, the same formulas (may have different values) may be used to compute RI values for some or all flow entries in a cached flow table.

In a cached flow table, flow entries may comprise or correspond to active connections, which may encounter continuous inflow of traffic (e.g., in the form of packets). Therefore, updating recency and frequency of all flow entries with every incoming packet may be both expensive and misguiding. For practical purposes, a continuous traffic flow, which may comprise a plurality of consecutive packets from a given source for a given destination, may be considered herein as a single instance of cache hit.

In an example embodiment, recency and frequency values are updated when an SDN switch (e.g., the switch 120) encounters a new instance of the same traffic flow. For example, when the SDN switch sequentially receives two continuous traffic flows, the SDN switch may forward a first continuous traffic flow based on a forwarding path specified by a flow entry. During or after forwarding the first continuous traffic flow, the SDN switch may update the usage recency and the usage frequency resulting in a first updated value of the usage recency (e.g., set to current time stamp) and a first updated value of the usage frequency (e.g., increase by one). Further, after forwarding the first continuous traffic flow, the SDN switch may forward a second continuous traffic flow based on the same forwarding path, and then update the usage recency and the usage frequency again resulting in a second updated value of the usage recency (e.g., set to new current time stamp) and a second updated value of the usage frequency (e.g., increase again by one).

However, it should be noted that there is a chance that the flow entry for a connection with continuous traffic flow may be evicted mid-instance (or mid-session), e.g., if the flow entry has not been updated for long. Therefore, if desired, the recency and frequency values for relatively long-lasting flows may be updated periodically for multiple times, but may not be with every incoming packet.

Moreover, the recency and frequency parameters may be updated using the same temporal interval or different intervals. Further, it is expected that for any terminated connection, a restart of traffic flow may update both the recency and frequency values, regardless or irrespective of how short the restart interval is.

Figure 2:
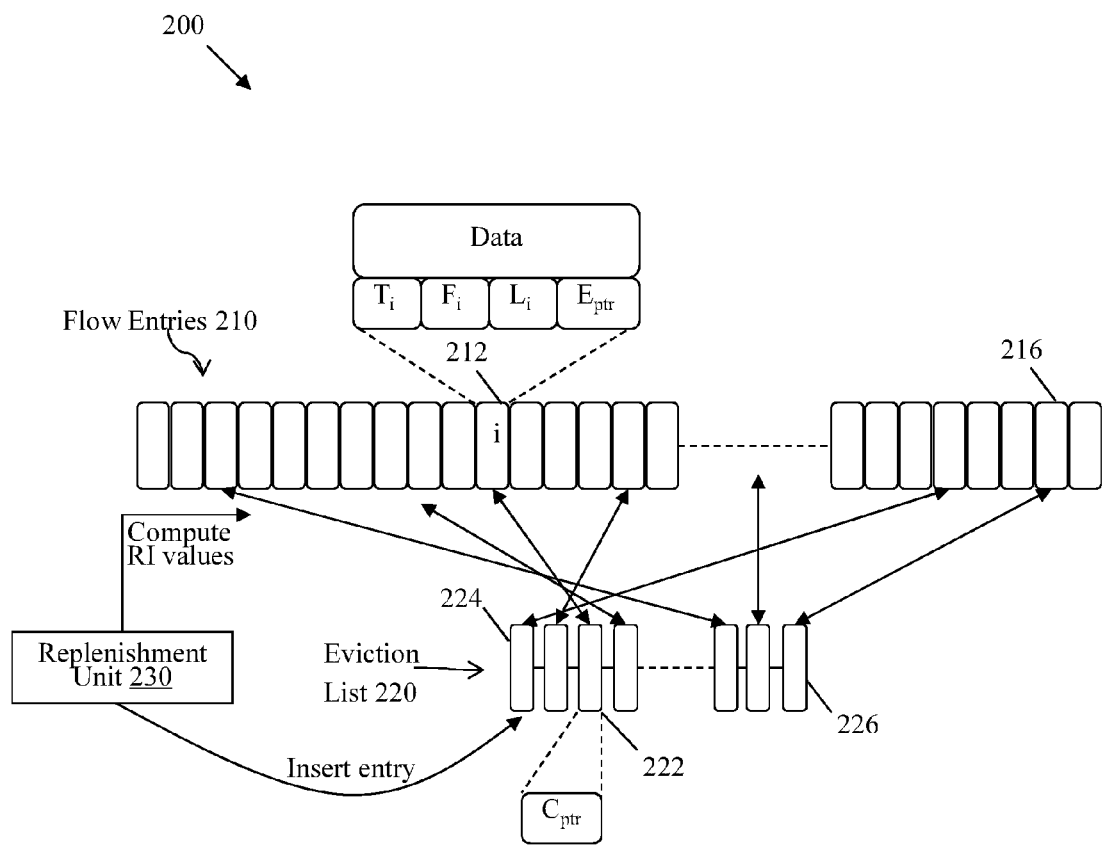
FIG. 2 illustrates an example embodiment of a cache replacement implementation.

As mentioned previously, the present disclosure may enable simplified implementation, which may avoid the computation of RI values for flow entries in the cache during cache replacement operations. Instead, a smaller list of flow entries, referred to herein as an "eviction list", is created to hold references to a fraction of flow entries that have a low range of RI values among all the flow entries. FIG. 2 illustrates an example embodiment of a CR implementation 200, in which an eviction list 220 is used. The CR implementation 200 may be implemented by a switch (e.g., the switch 120) in an SDN network (e.g., the network 100). As shown in FIG. 2, a cached flow table comprises a plurality of flow entries 210 including an i-th entry 212 (shown as an example of the flow entries 210). The flow entry 212 may comprise flow information, such as a source of a packet (e.g., the packet 140) and a destination of the packet. In addition, the flow entry 212 may comprise or be attached with its CR components, which may include at least one of the three parameters—recency (denoted as $T_i$), frequency (denoted as $F_i$), and latency sensitivity (denoted as $L_i$). Further, if there is any entry of the eviction list 220, such as an entry 222, that points or refers to the flow entry 212, a pointer (denoted as $E_{ptr}$) may be contained or attached to the flow entry 212 to point to the reference entry 222. If the flow entry 212 is not referred to or pointed to by the eviction list 220, the pointer $E_{ptr}$ value may be set to null or any arbitrary value.

The eviction list 220 may be implemented as a separate data structure stored in the cache of a switch, and may comprise entries that correspond to a fraction of the flow entries 210. In the CR implementation 200, each list entry (in short as entry) in the eviction list 220 may comprise or be attached to a pointer or table index (denoted as $C_{ptr}$), which points to one of the flow entries 210. The eviction list 220 may be maintained as a linked list in sorted order of RI values of their respective cached flow entries. For example, as shown in FIG. 2, the leftmost entry 224 in the eviction list 220 may have the highest RI value among entries in the eviction list 220, while the rightmost entry 226 in the eviction list 220 may have the lowest RI value among entries in the eviction list 220. Note that any flow entry not referenced by the eviction list 220 may have an RI value higher than some or all flow entries referenced by the eviction list 220.

In an example embodiment of a CR operation, when all of the flow entries 210 are full and a new connection needs to be added to the flow entries 210, the entry 226 (with lowest RI value) is removed from the eviction list 220. Although, it should be understood throughout this disclosure and by one of ordinary skill in the art that, in some cases, the entry 226 may be removed even if some of the flow entries 210 are not full. Further, to complete the CR operation, the flow data in a flow entry 216 pointed to by the entry 226, may be evicted so that the new connection may be added to the evicted flow entry 216 thereafter.

It can be seen that with each eviction operation, the eviction list 220 gets shorter. In addition, the eviction list 220 may get shorter if any of the referenced flow entries gets reused while in the cached flow table. In such cases, the referenced flow entry may be removed from the eviction list 220 (no longer a contender for eviction), because the flow entry may be updated in terms of its recency and frequency. The RI value may be recomputed consequently, which may turn out to be higher than the original highest RI value (upper bound) in the eviction list 220.

Various approaches may be used herein to replenish the eviction list 220. In an example embodiment, entries may be removed from the eviction list 220 one by one until the eviction list 220 reduces to empty. At that point, RI may be recomputed for the entire cached flow table, and a new eviction list may be generated. The generation of a new eviction list from scratch may incur a computational complexity in the order of $O(n^2)$, where n is the number of flow entries in a cached flow table. In an alternative example embodiment, once created, the eviction list 220 may be replenished continuously, which may help reduce computation complexity.

In a cached flow table, when a flow entry (e.g., the flow entry 212) is reused, the flow entry stays in the cached flow table, and its CR components may be updated. For example, the recency value of the flow entry 212 may get a new time stamp, and a counter counting the frequency of the flow entry 212 may be incremented by one, which leads to an increased RI value. Further, if the $E_{ptr}$ for the flow entry 212 is not null, the increased RI value may be compared with an upper bound of RI value (e.g., the RI value corresponding to the leftmost entry 224) of the eviction list 220. If the updated RI value of the flow entry 212 is higher than the current upper bound of the eviction list 220, the corresponding entry 222 may be removed from the eviction list 220, and the $E_{ptr}$ value of the flow entry 212 may be reset to null. Otherwise, if the updated RI value of the flow entry 212 is still equal to or less than the current upper bound of the eviction list 220, the corresponding entry 222 may be kept in the eviction list 220 but moved to a new position in the eviction list 220 according to the updated RI value of the flow entry 212.

To simplify implementation, in some example embodiments, it may be assumed that, after repeated recomputation of RI values, entries in the eviction list 220 continue to have the lowest RI values among the flow entries 210. Further, it may be assumed that entries in the eviction list 220 continue to maintain their relative RI values (i.e., entries do not need to be re-ordered with respect to other entries in the eviction list 220). Both of these assumptions may be approximations of practical cases, and could be proven wrong in very rare circumstances. In practice, for a given frequency and latency sensitivity, the RI values for flow entries in a cached flow table may normally maintain their relative orders with respect to other flow entries in the same table. It is possible that, when recency value approaches zero (flow entry not used for the longest time), two flow entries with different frequency values may end up exchanging their orders if their RI values are recomputed. However, this occasion may be rare and may have very little or no impact on the overall effectiveness of disclosed CR schemes and implementations.

As mentioned previously, if the eviction list 220 shrinks to empty after multiple CR operations, a recomputation of RI values for some or all of the flow entries 210 may be required in order to create a new eviction list, since the new eviction list needs to have the lowest range of RI values. Recomputing all RI values may be resource-intensive and time-consuming, which may cause traffic interruption. Therefore, in some example embodiments, entries of the eviction list 220 may be continuously replenished so that the eviction list 220, once created, does not reduce to empty.

To accomplish continuous replenishment of the eviction list 220, a background process or application may run continuously in an SDN switch (e.g., the switch 120). The background process may be implemented as a replenishment module or unit 230 and may be used to compute RI values following a pre-configured algorithm, e.g., in a round robin fashion. In use, the background process may be running at a relatively low priority compared to other processes (e.g., packet forwarding processes) to avoid affecting the other processes or operations. However, if the eviction list 220 is losing entries faster that replenishing them (i.e., size of the eviction lists 220 decreases), the priority of the background process may be increased accordingly, so that the size of the eviction list 220 may remain unchanged or relatively stable.

In use, a maximal size of the eviction list 220 may be pre-configured, e.g., as an absolute number or as a percentage of the total number of flow entries 210 in a cached flow table. At any point in time, the RI values of some or all of the flow entries 210 may be distributed over a certain range, that is, between the lowest and highest RI values computed most recently. To locate the upper boundary RI value of an updated eviction list, the updated eviction list may be mapped to flow entries at the lower end of the distribution. The replenishment unit 230 may count the number of flow entries starting from the lowest RI value of flow entries. When the number of flow entries reaches the pre-configured maximal size of the eviction list, the last counted flow entry will then have the upper bound of RI value in the updated eviction list.

Figure 3:
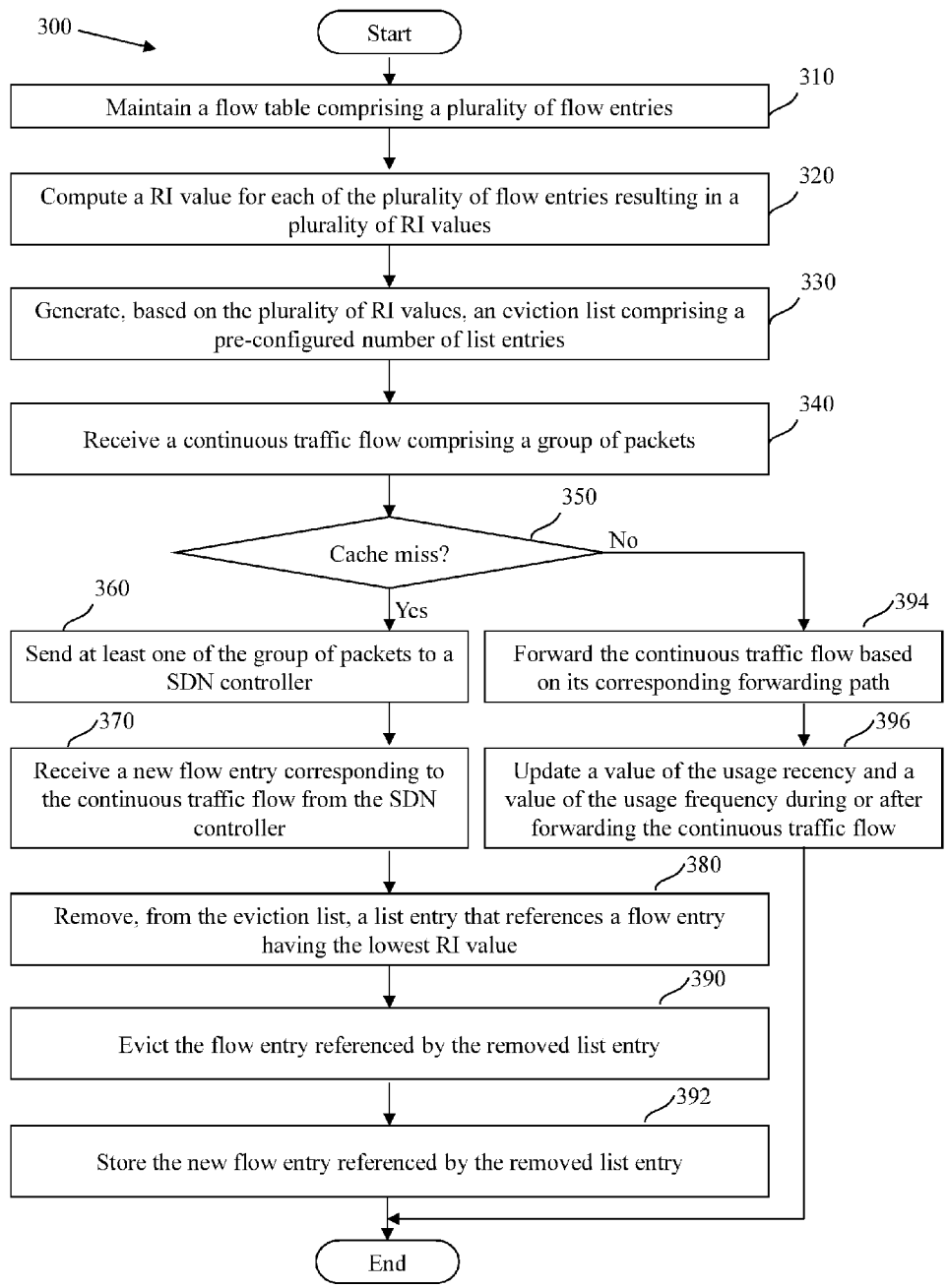
FIG. 3 illustrates an example embodiment of a cache replacement method.

FIG. 3 illustrates an example embodiment of a cache replacement method 300, which may be implemented by a switch (e.g., the switch 120) in an SDN network (e.g., the network 100). The method 300 starts in step 310, in which the method 300 may store and maintain a flow table comprising a plurality of flow entries.

In step 320, the method 300 may compute an RI value for each of the plurality of flow entries resulting in a plurality of RI values, wherein computing an RI value for a flow entry is at least partially based on latency sensitivity of a forwarding path specified by the flow entry. The step 320 may be used to create an initial eviction list. In an example embodiment, computing the RI value for the flow entry is further based on usage recency of the flow entry and usage frequency of the flow entry. Further, the usage frequency may be adjustable, e.g., incrementing by one after a reuse instance of the flow entry.

In step 330, the method 300 may generate, based on the plurality of RI values, an eviction list comprising a pre-configured number of list entries. In an example embodiment, each of the list entries refers or points to one of at least a fraction of the flow entries, wherein the fraction of the flow entries have RI values between the lowest of the plurality of RI values and an upper boundary RI value, wherein any flow entry not referenced by the eviction list has an RI value greater or equal to the upper boundary RI value.

In step 340, the method 300 may receive a continuous traffic flow comprising a group of (one or more) packets from a source network unit. In step 350, the method 300 may determine whether a cache miss occurs. The cache miss occurs when a forwarding path determined by a source and a destination of the continuous traffic flow cannot be obtained from any flow entry in the flow table stored in step 310. If the condition in the step 350 is met, the method 300 may proceed to step 360; otherwise, if a cache hit occurs, the method 300 may proceed to step 394.

In step 360, the method 300 may send at least one of the group of packets to an SDN controller (e.g., the SDN controller 110). The SDN controller may determine a new flow entry for the received packet(s), and send back to the switch data comprising the new flow entry. The new flow entry sent from the SDN controller may comprise the determined latency sensitivity of the packet(s). In step 370, the method 300 may receive the new flow entry corresponding to the continuous traffic flow from the SDN controller. In step 380, the method 300 may remove, from the eviction list, a list entry that references an existing flow entry having the lowest RI value in the eviction list. In step 390, the method 300 may evict the existing flow entry referenced by the removed list entry. In step 392, the method 300 may store the new flow entry referenced by the removed list entry.

If a cache hit occurs in step 350, in step 394, the method 300 may forward the continuous traffic flow based on its corresponding forwarding path. In step 396, the method 300 may update a value of the usage recency and a value of the usage frequency during or after forwarding the continuous traffic flow, since a cache hit brings a reuse of a flow entry comprising the forwarding path. It should be understood that the method 300 may only serve as one example to illustrate the CR strategy or policy disclosed herein. A person of ordinary skill in the art will recognize that variations of the method 300 can be implemented. Also, the execution steps of the method 300 may be changed flexibly, if desired, as long as a following step does not depend on its preceding step. For example, the step 390 may be performed before, simultaneously with, or after the step 380. Further, the method 300 may only include a portion of all necessary steps in implementing a CR policy, and other steps may be added accordingly. For example, recreation or replenishment of the eviction list may be needed.

The CR strategy disclosed herein may take the latency sensitivity into consideration, which enhances the forwarding performance of latency sensitive applications or flows. Moreover, The CR strategy disclosed herein may compute the relative strength of a cached flow entry based on its variable usage frequency, its latency sensitivity level, and the period between references (recency). Further, The CR strategy disclosed herein may not need any complex or unbounded data structures, thus adding little overhead.

Figure 4:
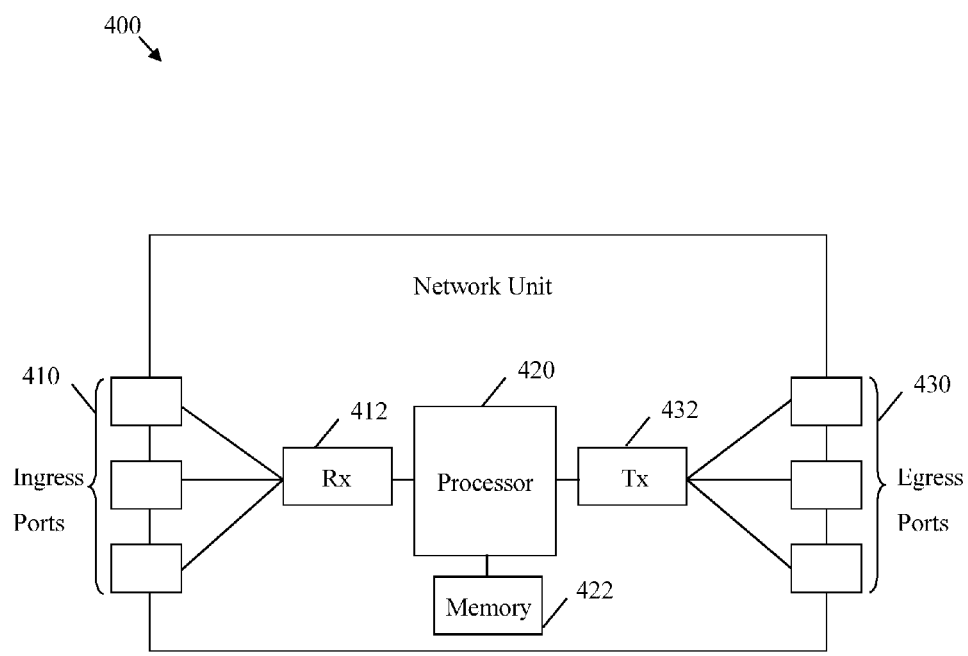
FIG. 4 illustrates an example embodiment of a network unit.

FIG. 4 illustrates an example embodiment of a network device or unit 400, which may be any device configured to transport packets through a network. For instance, the network unit 400 may correspond to the switch 120. The network unit 400 may comprise one or more ingress ports 410 coupled to a receiver 412 (Rx), which may be configured for receiving packets or frames, objects, options, and/or type length values (TLVs) from other network components. The network unit 400 may comprise a logic unit or processor 420 coupled to the receiver 412 and configured to process the packets or otherwise determine which network components to send the packets. The processor 420 may be implemented using hardware, or a combination of hardware and software.

The network unit 400 may further comprise a memory 422, which may be a memory configured to store a flow table, or a cache memory configured to store a cached flow table. The network unit 400 may also comprise one or more egress ports 430 coupled to a transmitter 432 (Tx), which may be configured for transmitting packets or frames, objects, options, and/ or TLVs to other network components. Note that, in practice, there may be bidirectional traffic processed by the network unit 400, thus some ports may both receive and transmit packets. In this sense, the ingress ports 410 and the egress ports 430 may be co-located or may be considered different functionalities of the same ports that are coupled to transceivers (Rx/Tx). The processor 420, the memory 422, the receiver 412, and the transmitter 432 may also be configured to implement or support any of the schemes and methods described above, such as the CR implementation 200 and the CR method 300.

It is understood that by programming and/or loading executable instructions onto the network unit 400, at least one of the processor 420 and the memory 422 are changed, transforming the network unit 400 in part into a particular machine or apparatus (e.g. an SDN switch having the functionality taught by the present disclosure). The executable instructions may be stored on the memory 422 and loaded into the processor 420 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

Figure 5:
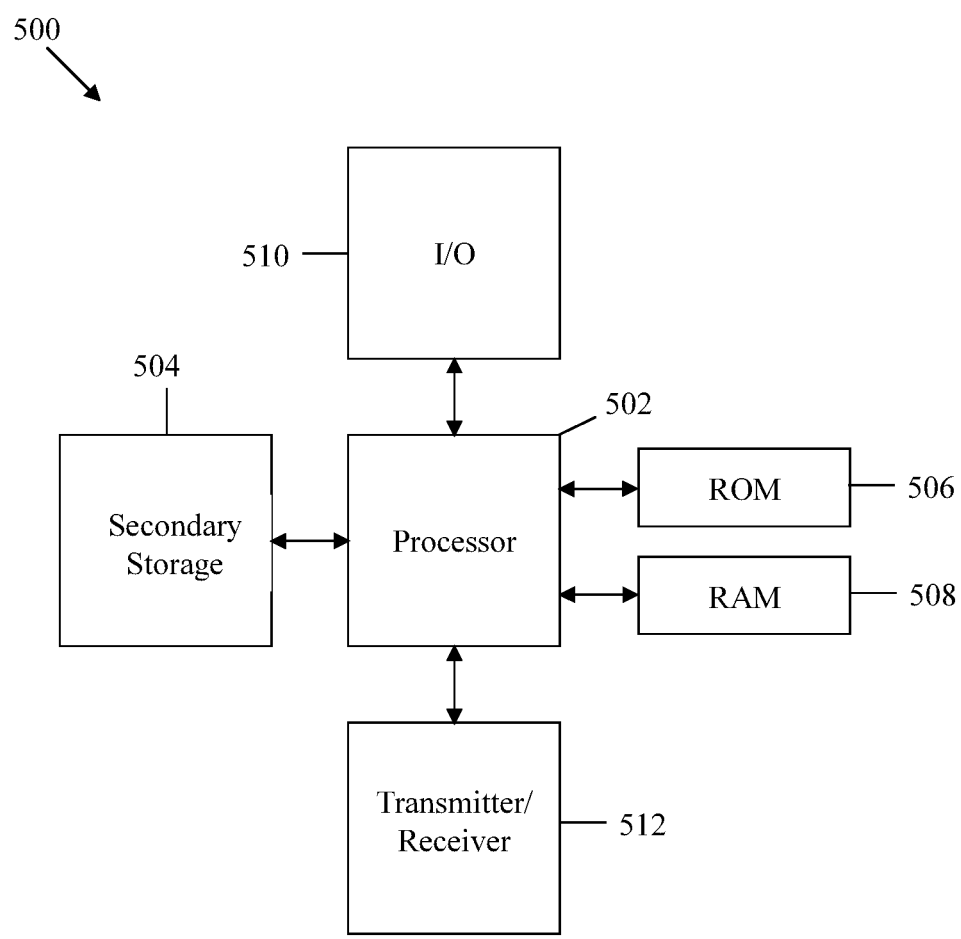
FIG. 5 illustrates an example embodiment of a computer system or network device (ND).

The schemes described above may be implemented on a network component, such as a computer or network component with sufficient processing power, memory resources, and network throughput capability to handle the necessary workload placed upon it. FIG. 5 illustrates an example embodiment of a computer system or network device (ND) 500 suitable for implementing one or more embodiments of the systems and methods disclosed herein, such as the SDN controller 110.

The ND 500 includes a processor 502 that is in communication with memory devices including secondary storage 504, read only memory (ROM) 506, random access memory (RAM) 508, input/output (I/O) devices 510, and transmitter/receiver 512. Although illustrated as a single processor, the processor 502 is not so limited and may comprise multiple processors. The processor 502 may be implemented as one or more central processor unit (CPU) chips, cores (e.g., a multi-core processor), field-programmable gate arrays (FPGAs), ASICs, and/or digital signal processors (DSPs). The processor 502 may be configured to implement any of the schemes described herein, including the CR implementation 200 and the CR method 300. The processor 502 may be implemented using hardware or a combination of hardware and software.

The secondary storage 504 is typically comprised of one or more disk drives or tape drives and is used for non-volatile storage of data and as an over-flow data storage device if the RAM 508 is not large enough to hold all working data. The secondary storage 504 may be used to store programs that are loaded into the RAM 508 when such programs are selected for execution. The ROM 506 is used to store instructions and perhaps data that are read during program execution. The ROM 506 is a non-volatile memory device that typically has a small memory capacity relative to the larger memory capacity of the secondary storage 504. The RAM 508 is used to store volatile data and perhaps to store instructions. Access to both the ROM 506 and the RAM 508 is typically faster than to the secondary storage 504.

The transmitter/receiver 512 (sometimes referred to as a transceiver) may serve as an output and/or input device of the ND 500. For example, if the transmitter/receiver 512 is acting as a transmitter, it may transmit data out of the ND 500. If the transmitter/receiver 512 is acting as a receiver, it may receive data into the ND 500. Further, the transmitter/receiver 512 may include one or more optical transmitters, one or more optical receivers, one or more electrical transmitters, and/or one or more electrical receivers. The transmitter/receiver 512 may take the form of modems, modem banks, Ethernet cards, universal serial bus (USB) interface cards, serial interfaces, token ring cards, fiber distributed data interface (FDDI) cards, and/or other well-known network devices. The transmitter/receiver 512 may enable the processor 502 to communicate with an Internet or one or more intranets. The I/O devices 510 may be optional or may be detachable from the rest of the ND 500. The I/O devices 510 may include a video monitor, liquid crystal display (LCD), touch screen display, or other type of display. The I/O devices 510 may also include one or more keyboards, mice, or track balls, or other well-known input devices.

Similar to the network unit 400, it is understood that by programming and/or loading executable instructions onto the ND 500, at least one of the processor 502, the secondary storage 504, the RAM 508, and the ROM 506 are changed, transforming the ND 500 in part into a particular machine or apparatus (e.g. an SDN controller or switch having the functionality taught by the present disclosure). The executable instructions may be stored on the secondary storage 504, the ROM 506, and/or the RAM 508 and loaded into the processor 502 for execution.

Any processing of the present disclosure may be implemented by causing a processor (e.g., a general purpose CPU) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc ROM (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

We claim:

1. In a network switch of a software-defined network (SDN) architecture, a computer-implemented method for improving cache replacement (CR) efficiency implemented therein, the method comprising:

maintaining a flow table comprising a plurality of flow entries describing a plurality of flows;

computing a replacement index (RI) value for each of the plurality flow entries resulting in the plurality of RI values, the RI values indicating CR priority for eviction of each flow from the flow table based on flow latency sensitivity of each flow, usage recency of each flow entry, and usage frequency of each flow entry, wherein values of usage recency and usage frequency are updateable with reuse of an associated flow entry;

generating, based on at least some of the computed RI values, an eviction list comprising eviction list entries indicating the flow entries provisionally selected for eviction from the flow table based on the flow entries' RI values;

removing, from the eviction list, an eviction list entry that references a lowest flow entry having a lowest computed RI value;

evicting a forwarding path from a first flow entry referenced by the removed eviction list entry;

repeatedly removing, from the eviction list, eviction list entries that reference flow entries having a currently lowest RI value, until the eviction list becomes empty;

after the eviction list becomes empty, recomputing an RI value for each of the flow entries resulting in a second set of RI values; and generating, based on the second set of RI values, a new eviction list comprising a same number of list entries as initially employed by the eviction list, wherein any flow entry not referenced by the new eviction list has an RI value greater or equal to an upper boundary RI value referenced by the new eviction list.

2. The method of claim 1, wherein computing the RI values for the flow entries are further based on usage recency of the flow entries and usage frequency of the flow entries.

3. The method of claim 2, further comprising:

forwarding a first continuous traffic flow based on a forwarding path specified by a second flow entry;

updating a first usage recency for the second flow entry and a first usage frequency for the second flow entry resulting in a first updated value of the first usage recency and a first updated value of the first usage frequency;

after forwarding the first continuous traffic flow, forwarding a second continuous traffic flow based on the forwarding path; and updating the first usage recency and the first usage frequency again resulting in a second updated value of the first usage recency and a second updated value of the first usage frequency.

4. The method of claim 2, further comprising:

periodically updating a first usage recency at a first temporal interval; and periodically updating a first usage frequency at a second temporal interval that is no shorter than the first temporal interval.

5. The method of claim 2, wherein the flow entries in the eviction list have RI values from a lowest of the computed RI values to an upper boundary RI value, and wherein any flow entry not referenced by the eviction list has an RI value greater than or equal to the upper boundary RI value.

6. The method of claim 1, wherein recomputing the RI values and generating the new eviction list are implemented by a background process continuously running in the network switch.

7. A computer program product comprising computer executable instructions stored on a non-transitory computer readable medium such that when executed by a processor cause a switch to:

maintain a cached flow table comprising a plurality of flow entries describing a plurality of flows;

compute a replacement index (RI) value for each of the plurality of flow entries resulting in a plurality of RI values, the RI values indicating cache replacement (CR) priority for eviction of each flow from the flow table based on flow latency sensitivity of each flow, usage recency of each flow entry, and usage frequency of each flow entry, wherein values of usage recency and usage frequency are updateable with reuse of an associated flow entry;

generate, based on at least some of the computed RI values, an eviction list comprising eviction list entries indicating the flow entries provisionally selected for eviction from the flow table based on the flow entries' RI values;

remove, from the eviction list, a list entry that references a lowest flow entry having a lowest RI value;

evict a lowest forwarding path from the lowest flow entry;

repeatedly remove, from the eviction list, list entries that reference flow entries having a currently lowest RI value, until the eviction list becomes empty;

after the eviction list becomes empty, recompute an RI value for each of the plurality of flow entries resulting in second plurality of RI values; and generate, based on the second plurality of RI values, a second eviction list comprising a common number of list entries as initially employed by the eviction list, wherein any flow entry not referenced by the new eviction list has an RI value greater or equal to an upper boundary RI value referenced by the second eviction list.

8. The computer program product of claim 7, further comprising instructions that cause the switch to:

forward a first continuous traffic flow based on a first forwarding path specified by a first flow entry;

update a first usage recency and a first usage frequency for the first flow entry resulting in a first updated value of the first usage recency and a first updated value of the first usage frequency;

after forwarding the first continuous traffic flow, forward a second continuous traffic flow based on the first forwarding path; and update the first usage recency and the first usage frequency again resulting in a second updated value of the first usage recency and a second updated value of the first usage frequency.

9. The computer program product of claim 7, further comprising instructions that cause the switch to:

periodically update usage recency at a first temporal interval; and periodically update usage frequency at a second temporal interval that is no shorter than the first temporal interval.

10. The computer program product of claim 7, wherein the flow entries in the eviction list have RI values from a lowest of the plurality of RI values to an upper boundary RI value, and wherein any flow entry not referenced by the eviction list has an RI value greater or equal to the upper boundary RI value.

11. The computer program product of claim 7, wherein recomputing the RI values and generating the second eviction list are implemented by a background process continuously running in the computer program product.

* * * * *